United States Patent
Vergnes et al.

(10) Patent No.: US 8,805,906 B2
(45) Date of Patent: Aug. 12, 2014

(54) VARIABLE ARCHITECTURE FOR RANDOM NUMBER GENERATORS

(75) Inventors: Alain Vergnes, Trets (FR); Guillaume Pean, Aix en Provence (FR); Frederic Schumacher, Trets (FR)

(73) Assignee: Atmel Corporation, San Jose, CA (US)

( * ) Notice: Subject to any disclaimer, the term of this patent is extended or adjusted under 35 U.S.C. 154(b) by 666 days.

(21) Appl. No.: 13/044,304

(22) Filed: Mar. 9, 2011

(65) Prior Publication Data

US 2012/0233232 A1 Sep. 13, 2012

(51) Int. Cl.
*G06F 7/58* (2006.01)

(52) U.S. Cl.
USPC .......................................... 708/250

(58) Field of Classification Search
None
See application file for complete search history.

(56) References Cited

U.S. PATENT DOCUMENTS

| | | | | |
|---|---|---|---|---|
| 7,206,797 | B2* | 4/2007 | Gressel et al. | 708/250 |
| 8,130,950 | B2* | 3/2012 | Dolgunov et al. | 380/46 |
| 2008/0016135 | A1* | 1/2008 | Janke et al. | 708/251 |
| 2009/0110188 | A1* | 4/2009 | Dolgunov et al. | 380/28 |
| 2009/0248771 | A1* | 10/2009 | Vergnes et al. | 708/251 |
| 2010/0070549 | A1* | 3/2010 | Nagaraj | 708/254 |
| 2010/0106757 | A1* | 4/2010 | Matthews et al. | 708/251 |
| 2012/0213358 | A1* | 8/2012 | Dror et al. | 380/28 |

* cited by examiner

*Primary Examiner* — David H Malzahn

(74) *Attorney, Agent, or Firm* — Fish & Richardson P.C.

(57) ABSTRACT

A variable architecture for random number generators is disclosed. In some implementations, the architecture of a random number generator may be varied based on microcontroller-specific data stored on the microcontroller. For example, a random number generator module may be embedded in a microcontroller circuit. The random number generator module may be designed to receive input from data sources in the circuit that contain microcontroller-specific data (e.g., a unique chip identifier, data carried in fuse bits). In some implementations, the architecture of the random number generator module may be adjusted or varied based on the microcontroller-specific data.

21 Claims, 10 Drawing Sheets

US 8,805,906 B2

VARIABLE ARCHITECTURE FOR RANDOM NUMBER GENERATORS

TECHNICAL FIELD

This subject matter is generally related to electronics, and more particularly to microcontroller architectures that include random number generators.

BACKGROUND

Microcontrollers may include a random number generator module. The random number generator module can generate random numbers based on an input from an entropy source. Variations in the entropy source may affect the randomness of the data generated by random number generator modules embedded in microcontrollers. Microcontrollers in the same series or from the same production lot may have fewer variations in their entropy sources and may exhibit less variation in the randomness in the data generated between random number generators included in microcontrollers in a series.

SUMMARY

A variable architecture for random number generators is disclosed. In some implementations, the architecture of a random number generator may be varied based on microcontroller-specific data stored on the microcontroller. For example, a random number generator module may be embedded in a microcontroller circuit. The random number generator module may be designed to receive input from data sources in the circuit that contain microcontroller-specific data (e.g., a unique chip identifier, data carried in fuse bits). In some implementations, the architecture of the random number generator module may be adjusted or varied based on the microcontroller-specific data.

Particular embodiments can be implemented to realize one or more of the following advantages: (1) the randomness of numbers generated between random number generator modules in the same production series is improved; (2) power consumption related to generating random numbers is minimized; (3) the complexity of a production testing is minimized; and/or (4) production costs are reduced.

DETAILED DESCRIPTION

A variable architecture for random number generators is disclosed. In some implementations, the internal circuitry of a random number generator module may be designed to behave differently based on an input fed by non-volatile registers. For example, the non-volatile registers may be used for other purposes in the circuit where the random number generator is embedded and/or may already exist within the circuit. Implementations may allow different circuits of a same product family produced in a same production lot to produce different random number sequences even if a source of entropy (e.g., ring oscillator, linear feedback shift register ("LFSR")) is similar in each circuit.

When a random number generator module is designed, the source of entropy is an important factor for the randomness. For example, the source of entropy may provide a value from which the random number generator generates random data. High entropy sources (e.g., sources with a lot of random change) are difficult to find and are often based on analog cells. Relying on analog cells as a source of entropy may lead to increased power consumption and/or may introduce more complex production tests and associated costs.

However, by using pure digital entropy sources, a truly random sequence of numbers may be generated from microcontroller to microcontroller in the same production sequence while keeping energy consumption, the complexity of production testing and the associated costs at acceptable levels. Digital entropy sources may include ring oscillators, LSFRs, or other types of circuits, for example.

Example Microcontroller

Figure 1:
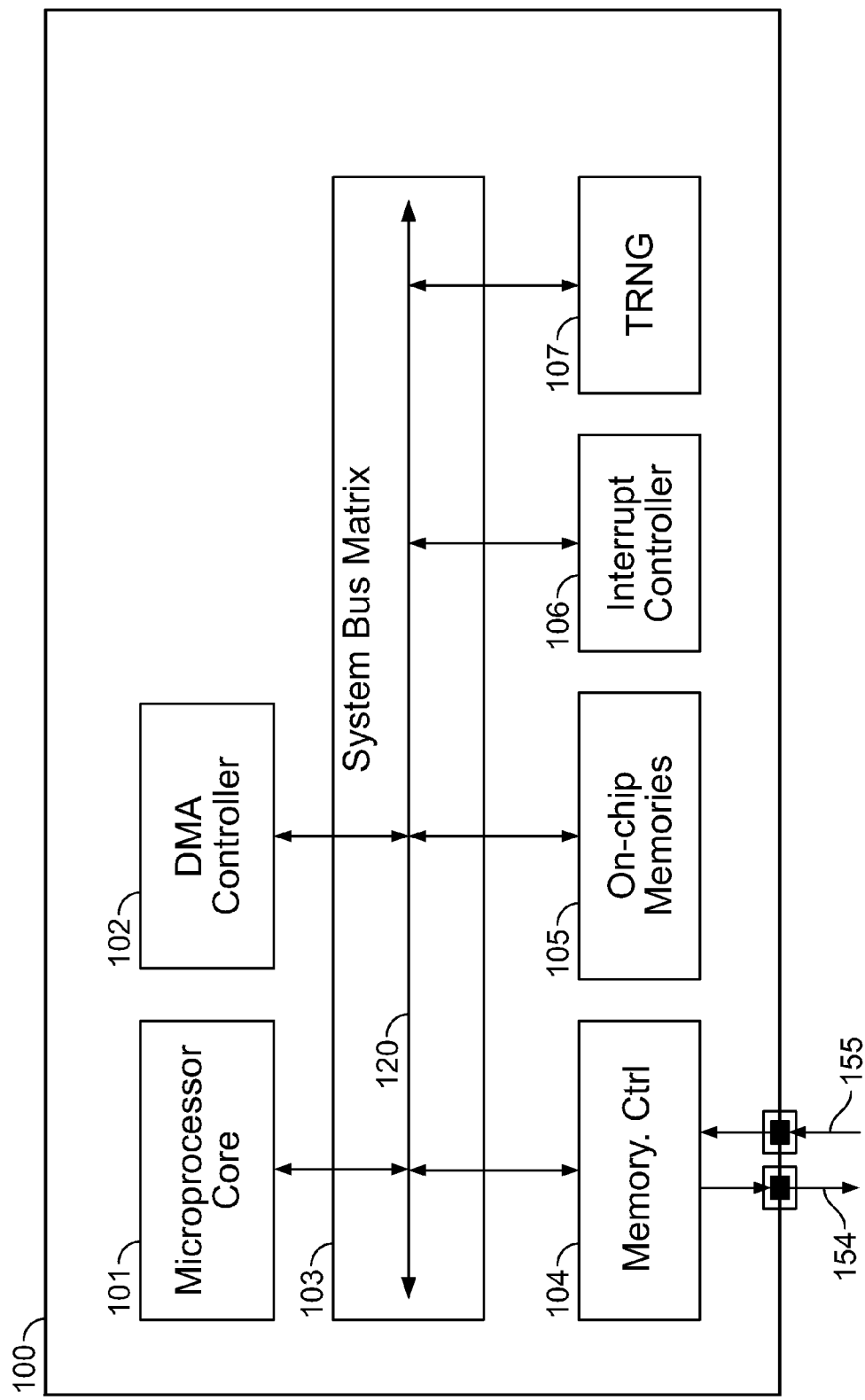
FIG. 1 is a block diagram of an example microcontroller including a random number generator.

FIG. 1 is a block diagram of an example microcontroller 100 including a microprocessor core 101 and a series of peripheral modules 102, 103, 104, 105, 106, and 107 connected through system bus matrix 103. For example, the system bus matrix 103 allows modules acting as master modules (e.g., modules 101, 102) to connect to slave modules (e.g., modules 105, 106, 107). In some implementations, master modules can initiate data transfers with the slave modules on the system bus matrix 103. For example, microprocessor core 101 and standalone direct memory access (DMA) controller 102 may be configured as master modules. Memory controller 104, on-chip memories 105, interrupt controller 106, and random number generator 107 may be configured as slave modules, for example. In some implementations, the interconnection between master modules and slave modules may be implemented in matrix module 103 using bus 120.

According to implementations, microcontroller 100 can communicate with external components through some of the modules. For example, the microcontroller 100 may communicate with a memory device using the memory controller 104. The modules can include terminal contact pads 154 and 155 that physically connect external components.

In some implementations, microprocessor core 101 can be configured to execute code that includes executable instructions. For example, the code may be stored in the on-chip memories 105 or in an external memory accessed using the memory controller 104. In some implementations, the external memory is larger than the on-chip memory 105.

In some implementations, true random number generator ("TRNG") module 107 can be configured to produce random data. For example, the random number generator 107 may generate a random sequence of bits. The randomness of the data generated by random number generator 107 may correlate to the quality of the entropy source. For example, if random number generator 107 includes input from a good entropy source random number generator 107 will generate data having more randomness.

Analog Entropy Sources

Consider an example random number generator that relies upon an analog entropy source. In some implementations, the analog entropy source can be designed using analog cells. For example, a resistor may have two terminals where one terminal is connected internally to a grounded power supply line and the other terminal feeds an amplifier. The amplifier may generate an analog signal (e.g., white noise) that has significant entropy. After converting the analog signal into a digital value using an analog-to-digital converter, a pure digital random value may be obtained which can be internally registered into random number generator 107 and transmitted on system bus 103 when access is required by master modules 102 and/or 103.

In some implementations, the analog entropy source may be derived from the power supply noise and/or thermal noise of a resistor. These sources of entropy may not depend on the manufacturing process, technology, size or value of the resistor. However, these sources of entropy may make volume production of circuits difficult because testing analog circuits may be more complex than testing a pure digital circuit. Moreover, the power consumption associated with analog cells may be greater than the power consumption associated with digital circuits.

Digital Entropy Sources

Consider now an example random number generator that relies upon a digital entropy source. Digital entropy sources may be more cost effective than analog entropy sources because testing digital entropy sources is less complex and takes less time than analog entropy sources.

Figure 2:
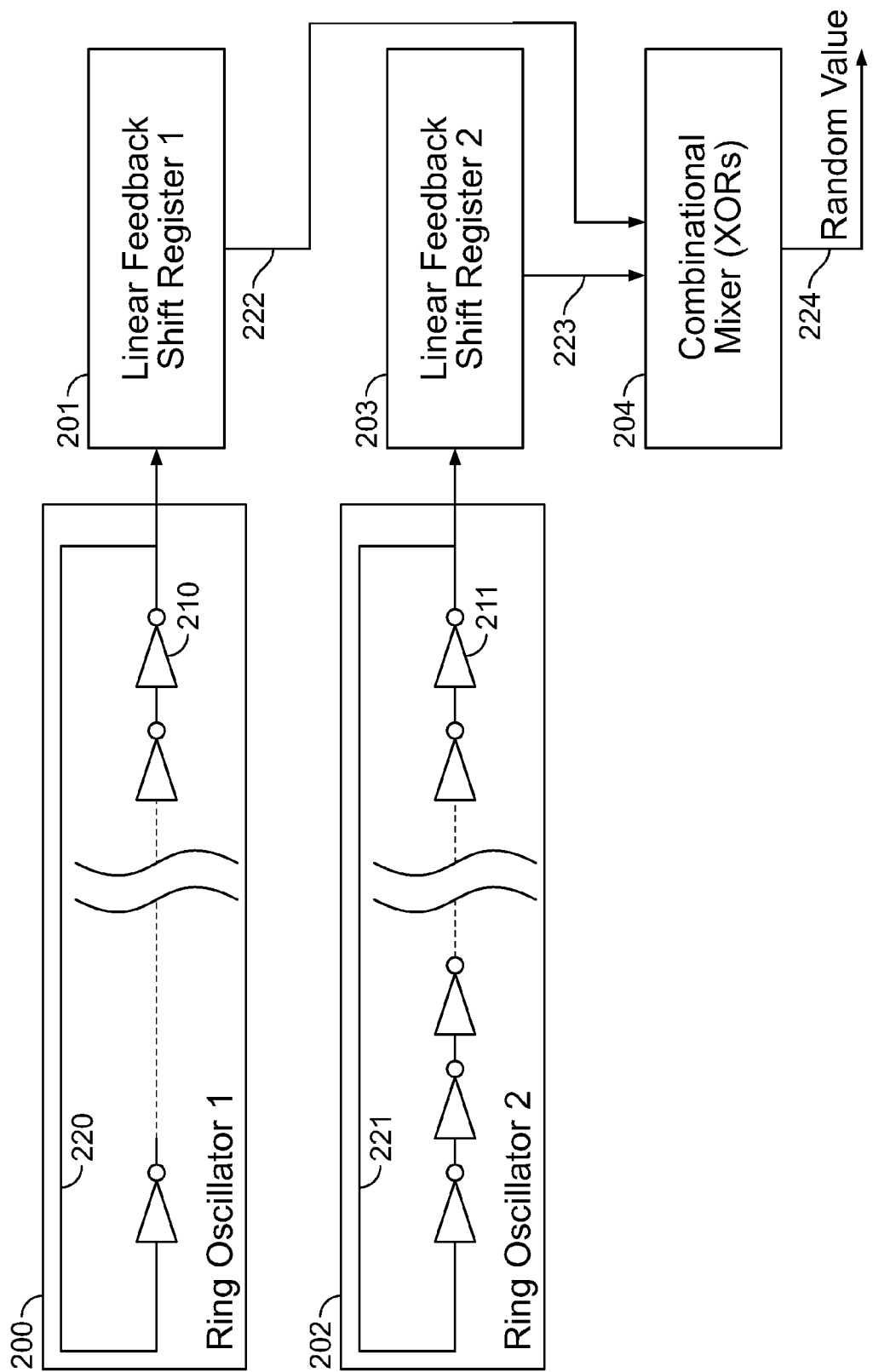
FIG. 2 illustrates an example entropy generating circuit.
Figure 3:
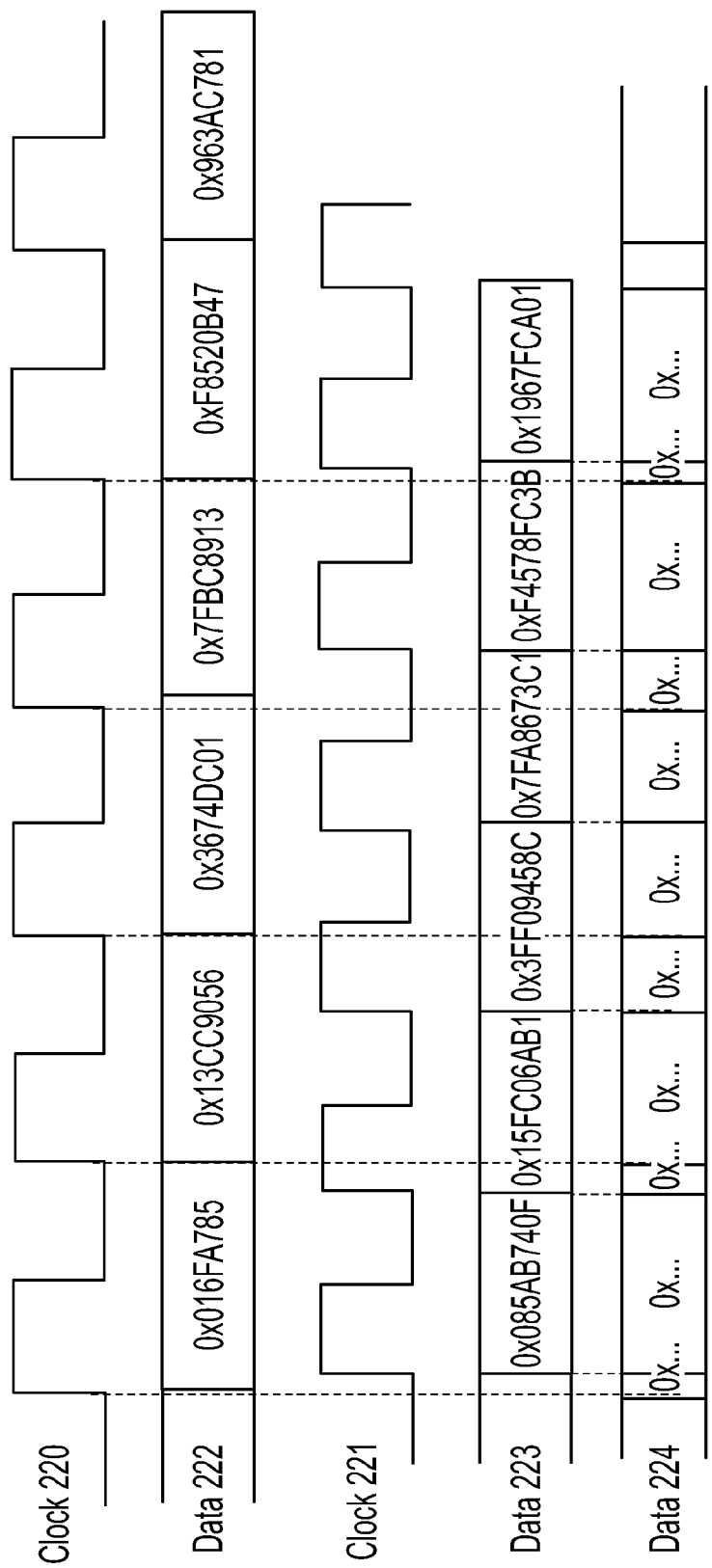
FIG. 3 is a graph of example signal wave forms that may be propagated through the source entropy circuit of FIG. 2.

FIG. 2 illustrates an example entropy generating circuit. FIG. 3 is a graph of example signal wave forms that may be generated by the circuit of FIG. 2. Referring to FIG. 2, ring oscillator 200 may include an odd number of inverter elements (e.g., inverter element 210). In some implementations, ring oscillator 200 may generate clock signal 220. For example, the free running frequency of clock signal 220 may depend on the internal propagation delay of each of the inverter elements of ring oscillator 200. The propagation delay may depend, for example, on the size of the elements, on the capacitive charge of each of the elements, on the temperature and also the power supply voltage which may vary due to noise on internal power supply lines. In some implementations, clock signal 220 can drive the clock input of LFSR module 201.

According to some implementations, a second ring oscillator (e.g., ring oscillator 202) can be built having architecture similar to that of ring oscillator 200. However, ring oscillator 202 may be constructed with a different number of inverters (e.g., inverter 211) than the number of inverters in ring oscillator 200 so that ring oscillator 202 can produce clock signal 221 that is fully asynchronous with clock signal 220. In some implementations, clock signal 221 can drive the clock input of LFSR module 203.

In some implementations, the LFSR modules 201 and 203 can generate a pseudo random value based on clock signals 220 and 221, respectively. For example, LFSR 201 may generate pseudo random data 222. LFSR 203 may generate pseudo random data 223. Because ring oscillators 200 and 202 produce fully asynchronous clock signals 220 and 221, the triggering period of data 222 may be different than the triggering period of data 223. In some implementations, the two data sequences (pseudo random data 222 and 223) can be mixed together using combinational mixer 204. For example, combinational mixer 204 may generate signal 224 based on data 222 and 223. Signal 224 may include a random data sequence. For example, signal 224 may be the random number output of a random number generator module.

Figure 4:
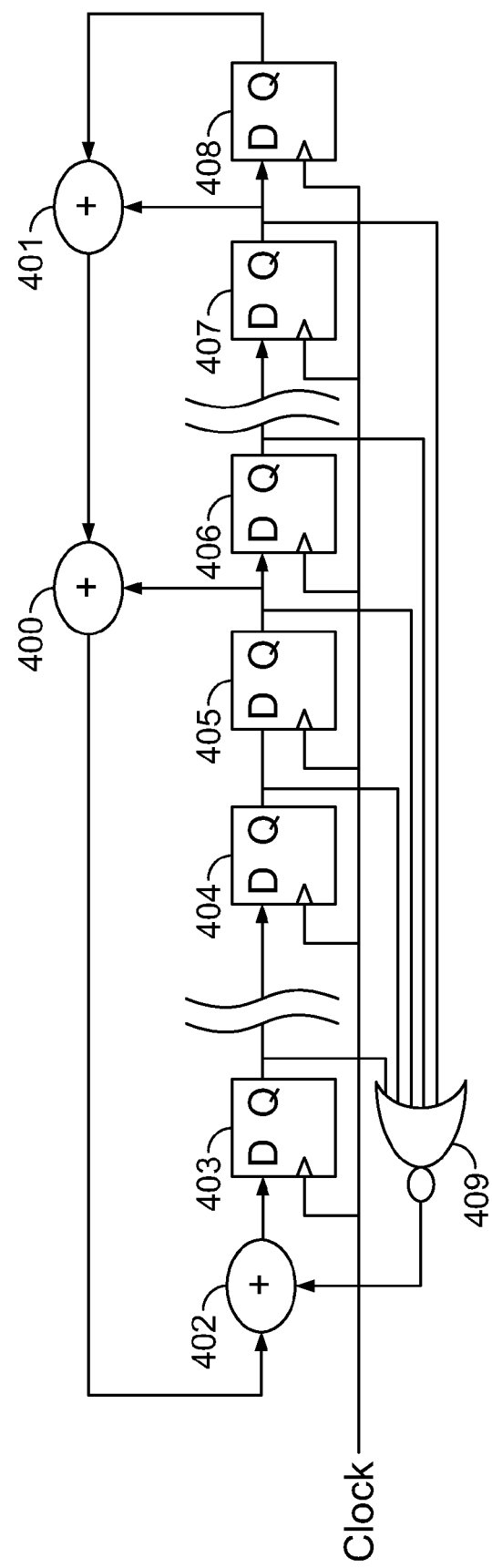
FIG. 4 illustrates example architecture for linear feedback shift registers.

FIG. 4 illustrates example architecture for linear feedback shift registers. For example, a LFSR may include a series of data flip-flops ("DFFs") 403, 404, 405, 406, 407 and 408 connected as shift registers. The first DFF (e.g., DFF 403) may be driven by the sum of several DFF outputs. Adders 400, 401 and 402 are made of two input XOR gates. Thus, the sum of the DFF outputs is modulo two. The sequence of values generated by all DFF outputs may differ depending on which DFF outputs are added together. For example, the circuitry of the LFSR implement a linear function that can be described with the polynomial $Y=1+X+X^N+X^M$, where N and M are positive integers. For example, N and M may be defined by the index of the DFF outputs selected for the generation of the sum.

In some implementations, gate 409 has been added to the LSFR to get $2^L$ values, where L is the number of DFFs (thus, including all zeros values). For example, when DFFs 403-407 equal zero and DFF 408 is one, output of adder 401 is one, output of adder 400 is zero and output of gate 409 is one, therefore the output of adder 402 is zero. Without gate 409, the LFSR would generate $2^L-1$ values. For example, after the next triggering edge of CLOCK, the DFFs may carry an all zero value. Without the action of gate 409, the LFSR would be stuck at zero. In some implementations, when a zero value is reached, gate 409 forces a one on output 402. Thus, on the next triggering edge of the clock, value 0000 . . . 001 will be carried on the DFFs outputs. For example, while at least one DFF among 403 to 407 carries a one on its output, gate 409 output is cleared and does not act in the whole LFSR.

Figure 5:
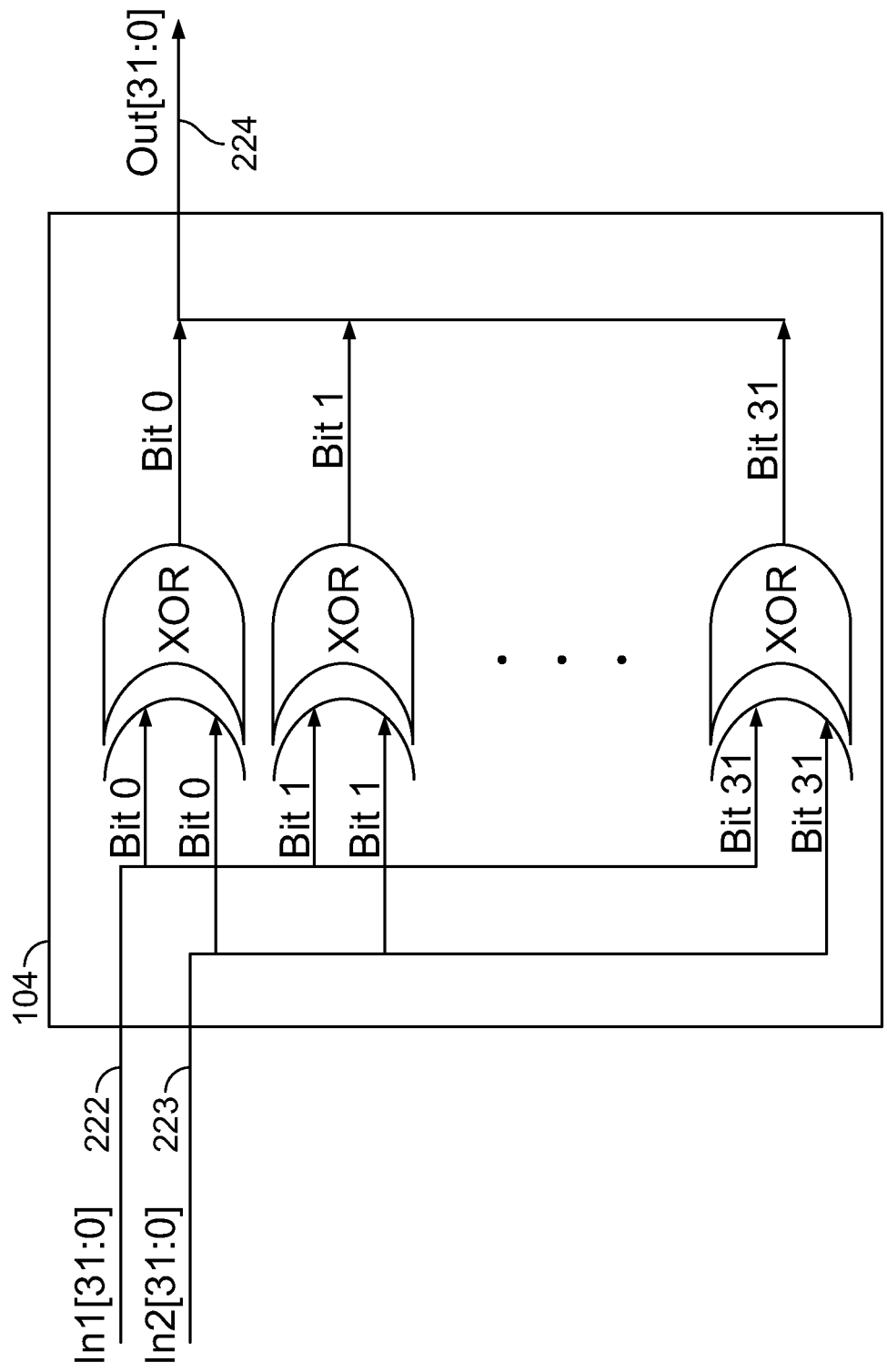
FIG. 5 illustrates an example combinational mixer circuit.

FIG. 5 illustrates example combinational mixer architecture. In some implementations, the combinational mixer 104 can include an XOR gate between each bit of the LFSRs outputs 222 and 223. According to implementations, the combinational mixer 104 can combine the outputs of LSFR 201 and LSFR 203 (e.g., outputs 222 and 223, respectively) to generate the random number output 224 of random number generator 107.

In some implementations, the source of entropy of random number generator 107 of FIG. 1 is based on the asynchronous clock sources (e.g., the oscillators 200 and 202) which are independent of any other clock source of microcontroller 100 and also based on LFSRs which together produce pseudo random sequences. For example, the clock signal frequencies generated by the ring oscillators (e.g., ring oscillators 200 and 202) depend on the voltage values across the digital cells of the ring and temperature which make the clock signal frequencies difficult to estimate. The voltage across the ring oscillator elements are subject to variation because the internal power supply lines are resistive and because the internal power supply lines also supply other circuitries/elements in the microcontrollers. Thus, the activities of the other circuitries or elements contribute to the voltage variations (e.g., noise) that may be found in the ring oscillators. The voltage variations or noise in the ring oscillators may contribute to the source of entropy required by the random number generator.

However, one of the problems with digital entropy sources is that when manufacturing a series of microcontrollers from the same lot of silicon wafers, two microcontrollers in the series that are used under the same conditions can exhibit roughly the same kind of noise. It is possible that two ring oscillators may have a difference in the geometry of their respective elements that can produce difference of clock frequencies in the ring oscillators. However, if the two microcontrollers are made from the same wafer and the same dies taken from the same area of a wafer, the probability of significant geometric differences occurring may decrease and causing the randomness in the data generated between microcontrollers to possibly decrease as well.

Variable Architecture

According to some implementations, unique features of a microcontroller can be used to vary the architecture of a random number generator. For example, some microcontrollers contain a unique chip identifier to differentiate one chip from another. Some microcontrollers contain fuse bits that can be programmed during test production in order to trim analog cells. For example, on-chip resistor capacitance based oscillators may include fuse bits. These sources of data (e.g., fuse bits, chip identifier, etc.) can differ from one circuit to another and may be used to vary the architecture of a random number generator module.

In some implementations, the internal architecture of a random number generator circuit can be varied based on a value received as an input to the circuit. For example, the received input value may be based on a unique chip identifier or fuse bits of the microcontroller or both. In some implementations, the source of entropy of a random generator can be generated by several sub-modules and each of the sub-modules can be adjusted based on the input to vary the architecture of the random number generator. For example, the architecture of the random number generators on each microcontroller of a series of microcontrollers may be adjusted based on input received from various inherent sources of data that are unique to each microcontroller in the series. By adjusting the architecture of random number generators based on data that is unique to each microcontroller, the randomness of the data generated by each random number generator in a series of microcontrollers may be improved.

Figure 6:
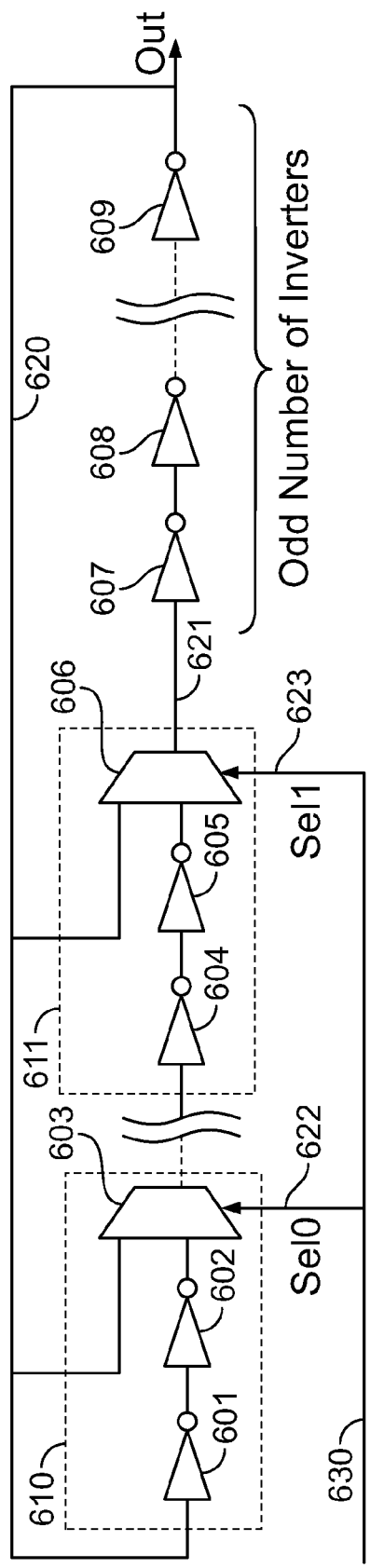
FIG. 6 illustrates an example variable frequency ring oscillator.

FIG. 6 illustrates an example variable frequency ring oscillator. In some implementations, the input 630 can be driven by unique chip identifier carried on fuse bits or on non-volatile memory bits. In some implementations, the ring oscillator propagation delay can be modified based on a value carried on signal 630, thus the clock frequency of the ring oscillator can also be modified based on signal 630.

In some implementations, each selection sub-module (e.g., sub-modules 610 and 611) can have three inputs, including one selection input (e.g., input 622 or 623) allowing the sub-modules to select between two other inputs. One of the two other inputs can be driven (for all sub-modules) by the ring oscillator output 620. The second of the two other inputs can be driven by the output of the preceding sub-module (e.g., sub-module 611 may be driven by sub-module 610). In some implementations, when signal 623 is set, the multiplexer 606 of sub-module 611 selects the input driven by signal 620 and the inherent propagation delay of the ring oscillator is created by cells 606-609. When signal 623 is cleared, the multiplexer 606 of sub-module 611 selects the input driven by cell 605. If select signal 622 is set, the inherent propagation delay of the ring oscillator is created by cells 603-609. If select signal 622 is not set, the inherent propagation delay of the ring oscillator is created by cells 601-609. Therefore, the ring oscillator modifies its propagation delay by adding cells in the ring to generate different behavior based on the digital value carried on signal 630. For example, cells may be added or removed from the ring oscillator based on the microcontroller-specific data (e.g., chip identifier, fuse bit data) carried on signal 630. Thus, even though all of the cells of the modified ring oscillator are manufactured and tested, only some of them may be used during the life of the circuit. Other sub-modules, such as LFSRs, of the digital random number generator can be modified in a similar fashion to implement sub-modules having variable architectures.

Figure 7:
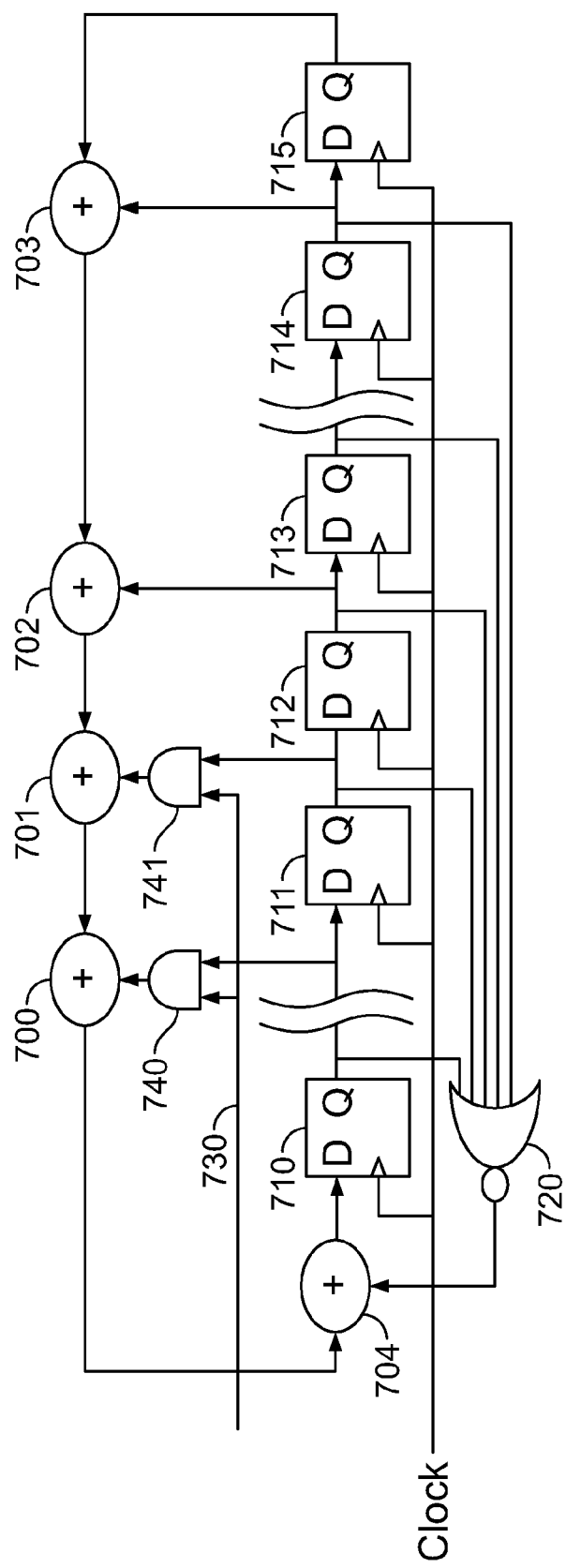
FIG. 7 illustrates an example variable linear feedback shift register.

FIG. 7 illustrates an example variable linear feedback shift register. In some implementations, the LSFR of FIG. 7 may generate a different sequence based on input 730. Input 730 may include microcontroller-specific data, such as a unique chip identifier or fuse bit values, for example. In some implementations, the LFSR of FIG. 7 may not generate full $2^N$ (N=number of DFFs) sequences based on the input 730. To get a full sequence for each value of the input 730, the AND gates (e.g., gates 740 and 741) can be placed based on the polynomial giving a full sequence. In other implementations, not shown, the AND gates can be driven by a decoder logic decoding input 730, in such a way to produce several but different full sequence polynomials (1 full sequence polynomial for each value on input 730).

In some implementations, the input 730 can be driven by a unique chip identifier carried on fuse bits or non-volatile memory bits. For example, each bit of signal 730 may drive an input of a two-bit AND gate (e.g., gates 740 and 741). The other input of the two-bit AND may be driven by the output of a data flip-flop (DFF) (e.g., DFFs 710-715) within the LFSR. When a digital value carried on signal 730 clears the input of AND gate 740, whatever the DFF 711 input value (being driven by a DFF output not shown), the output of the AND gate 740 may be stuck at zero and thus XOR gate 700 may behave as a buffer (e.g., transparent mode). If a digital value carried on signal 730 is set, AND gate 740 may behave as a buffer and may copy the DFF 711 input value to XOR gate 701. Thus, the sum generated on DFF 710 input may differ based on the value of the DFF output driving DFF 711. This behavior may repeat for each bit of the signal 730. Therefore, the polynomial may differ based on the value carried on signal 730.

In some implementations, the combination of the variable ring oscillator (FIG. 6) and the variable LSFR (FIG. 7) may cause the overall TRNG behavior to be modified based on the microcontroller-specific input values thereby causing the TRNG to generate different random sequences from one circuit to another, even within the same family and/or the same production lot when placed under similar conditions of use.

Figure 8:
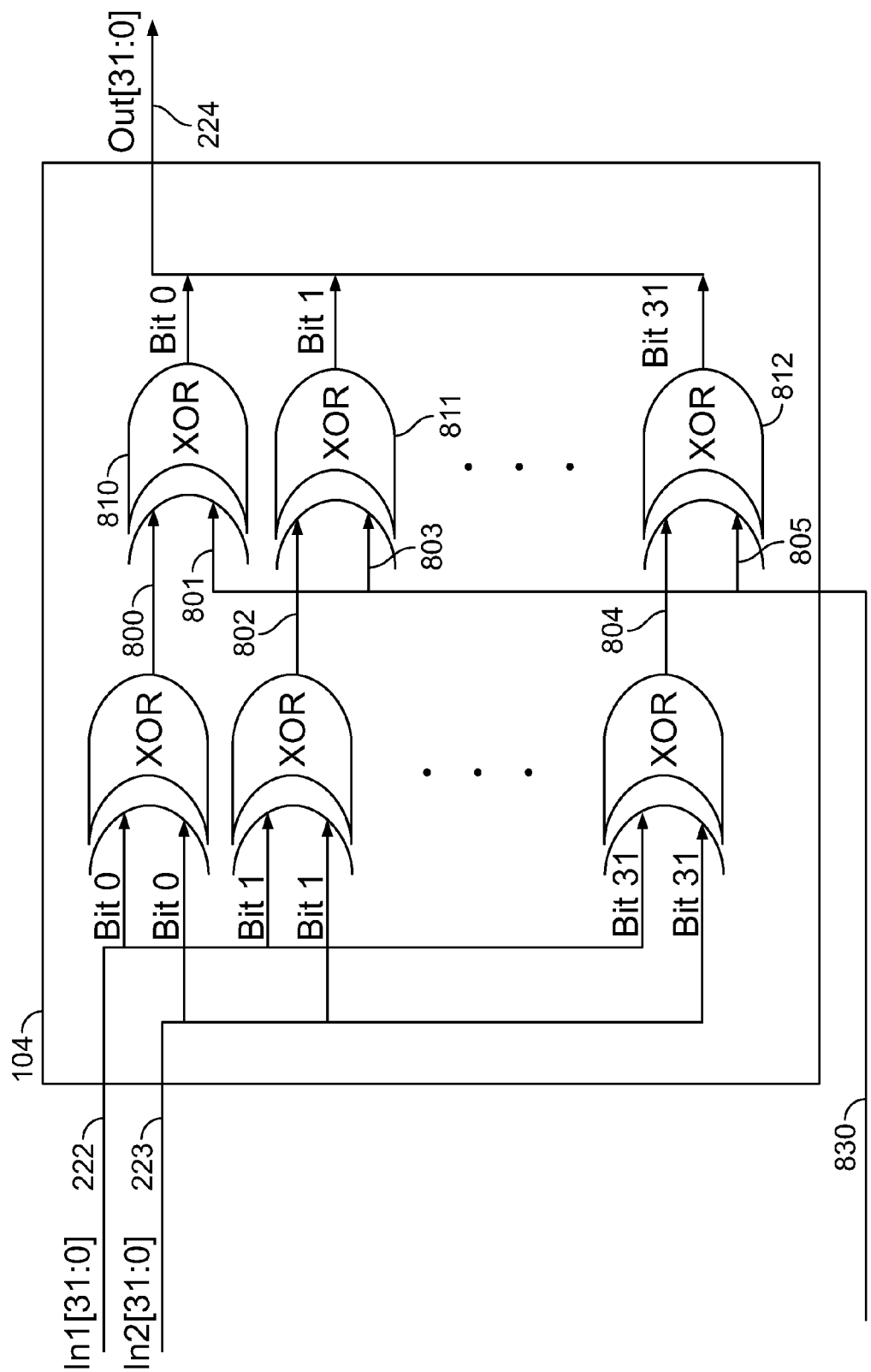
FIG. 8 illustrates an example variable combinational mixer.

FIG. 8 illustrates an example variable combinational mixer. In some implementations, a modification of the combinational mixer can be created by adding two-input XOR gates to invert some part of the initial output signal. For example, the XOR gates (e.g., XOR gates 810, 811 and 812) may be driven by the initial output bits (800, 802, and 804, respectively) and by input 830 (e.g., inputs 801, 803 and 805) that can be driven by fuse bits or non-volatile memory bits. When signal 801 is cleared, the XOR gate 810 can behave as a buffer for signal 800. When signal 801 is set, the XOR gate 810 can behave as an inverter for signal 800. Other XOR gates (e.g., XOR gates 810, 811 and 812) may behave in a similar manner. As a consequence, some bits of the initial mixer may be inverted based on the digital value carried on input 830 thereby generating a different pattern for the overall TRNG sequence output on signal 224.

Figure 9:
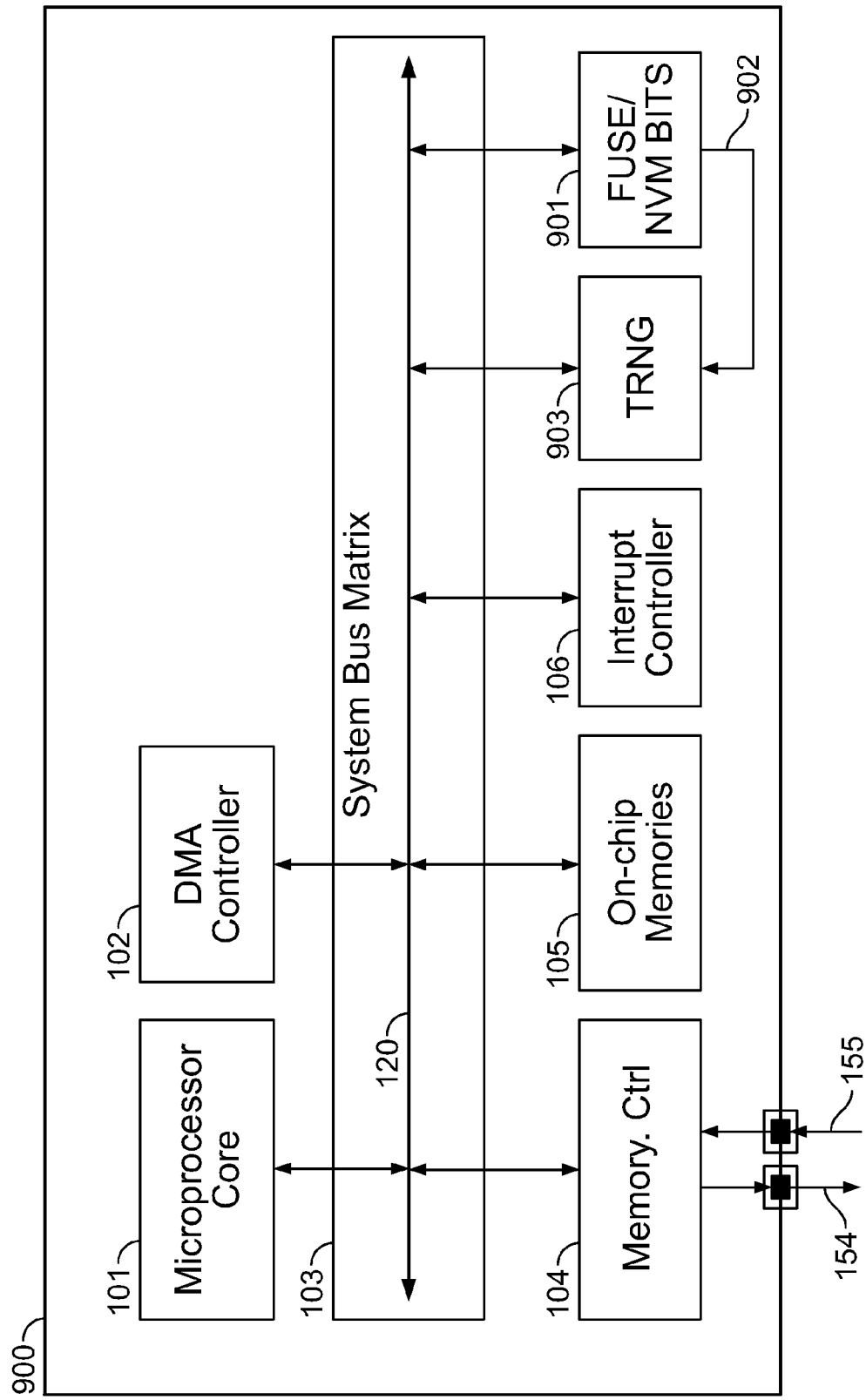
FIG. 9 is a block diagram of an example microcontroller including a random number generator having microcontroller-specific data inputs.

FIG. 9 is a block diagram of an example microcontroller 900 including a random number generator 903 having microcontroller-specific data inputs 902. For example, TRNG 903 may be coupled with FUSE BIT/NVM module 901 by means of signal 902. In some implementations, the signal 902 can remain stable for the entire life of the product, even if there is no restriction to change the digital value of signal 902 at any time.

Figure 10:
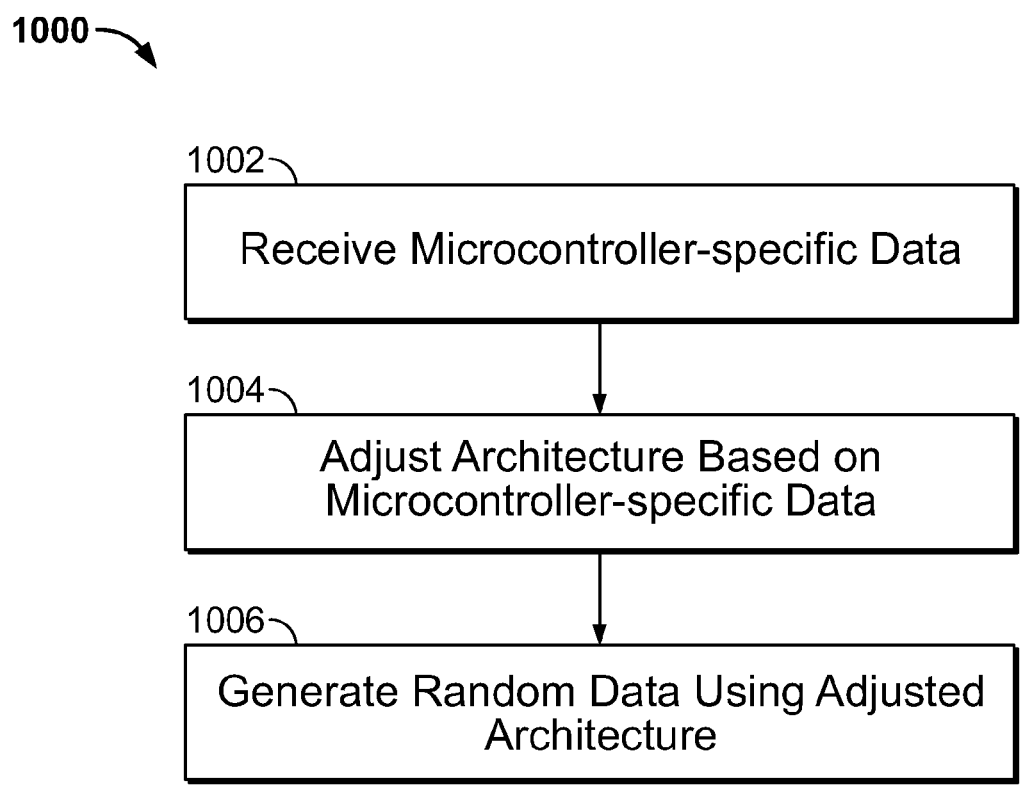
FIG. 10 is a flow diagram of an example process 1000 for varying the architecture of random number generators

FIG. 10 is a flow diagram of an example process 1000 for varying the architecture of random number generators. At step 1002, microcontroller-specific data can be received. For example, a random number generator may receive a chip identifier or data from one or more fuse bits configured on the microcontroller.

At step 1004, the architecture of the random number generator may be adjusted based on the received microcontroller-specific data. For example, the random number generator may include ring oscillator circuits, linear feedback shift registers and/or combinational mixer sub-modules. In some implementations, the architecture of each of these sub-modules can be adjusted based on the microcontroller-specific data. For example, cells, gates, or other circuit elements may be included or excluded from the processing of signals in each of the sub-modules based on the received microcontroller-specific data.

At step 1006, random data is generated using the adjusted architecture of the random number generator and its sub-modules. For example, by adjusting the architecture of the random number generator and its sub-modules according to the microcontroller-specific data, the random number generator can be configured to generate random data differently than that of random number generators included in other microcontrollers in the same product family and/or same production lot.

While this document contains many specific implementation details, these should not be construed as limitations on the scope what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

What is claimed is:

1. A system comprising:
a variable ring oscillator including one or more digital circuit elements configured by one or more digital values unique to the system to produce a clock; and
a variable linear feedback shift register coupled to the clock and configured by the one or more digital values to produce one or more pseudo random digital values.

2. The system of claim 1, where the one or more digital values are carried by fuse bits.

3. The system of claim 2, where the fuse bits carry a calibration of one or more analog cells embedded in the system.

4. The system of claim 2, where the fuse bits carry a unique identifier associated with the system.

5. The system of claim 1, where the one or more digital values are driven by input pads of the system.

6. The system of claim 1, where the one or more digital values are driven by outputs of flash memory embedded in the system.

7. The system of claim 6, where the outputs of flash memory carry a calibration of analog cells embedded in the system.

8. The system of claim 6, where the outputs of flash memory carry a unique identifier associated with the system.

9. The system of claim 1, where the one or more digital circuit elements included in the ring oscillator and configured to modify propagation delay in the ring oscillator.

10. The system of claim 9, where the propagation delay is modified by adding more delay elements in the ring oscillator.

11. The system of claim 10, where one or more digital circuit elements included in the linear feedback shift register coupled to the ring oscillator are configured by the digital values to modify a polynomial describing a linear function of the linear feedback shift register.

12. The system of claim 11, further comprising:
a combinational mixer architecture coupled to the linear feedback shift register and configured to invert at least a part of a random output signal of the combinational mixer.

13. The system of claim 1, where the system is a microcontroller.

14. The system of claim 13, where the one or more digital values are driven by a programmable register in the microcontroller.

15. The system of claim 14, where the programmable register is programmed with digital values previously read from non-volatile registers of the system.

16. A method comprising:
receiving in a microcontroller data unique to the microcontroller;
adjusting a variable ring oscillator in the microcontroller using the unique data to produce a clock;
adjusting a variable linear feedback shift register in the microcontroller that is coupled to the clock using the unique data and
generating a pseudo random sequence using an adjusted linear feedback shift register.

17. The method of claim 16, where receiving data unique to the microcontroller further comprises:
receiving at least one of fuse bits or a unique identifier of the microcontroller.

18. The method of claim 16, where adjusting the ring oscillator further comprises:
adjusting a propagation delay of the ring oscillator in a pseudo random number generator.

19. The method of claim 18, where adjusting the linear feedback shift register further comprises:
modifying a polynomial describing a linear function of a linear feedback shift register coupled to the ring oscillator.

20. The method of claim 19, further comprising:
inverting at least a part of a random output signal of a combinational mixer coupled to the linear feedback shift register.

21. The method of claim 16, where receiving in a microcontroller data unique to the microcontroller further comprises:
programming a programmable register in the microcontroller with unique data previously read from a non-volatile register of the microcontroller; and
retrieving the unique data from the programmable register.

* * * * *